Aug. 9, 1938. W. J. BAILEY 2,126,083
SAFETY WHEEL FOR AUTOMOBILES
Filed Sept. 28, 1937 4 Sheets-Sheet 2
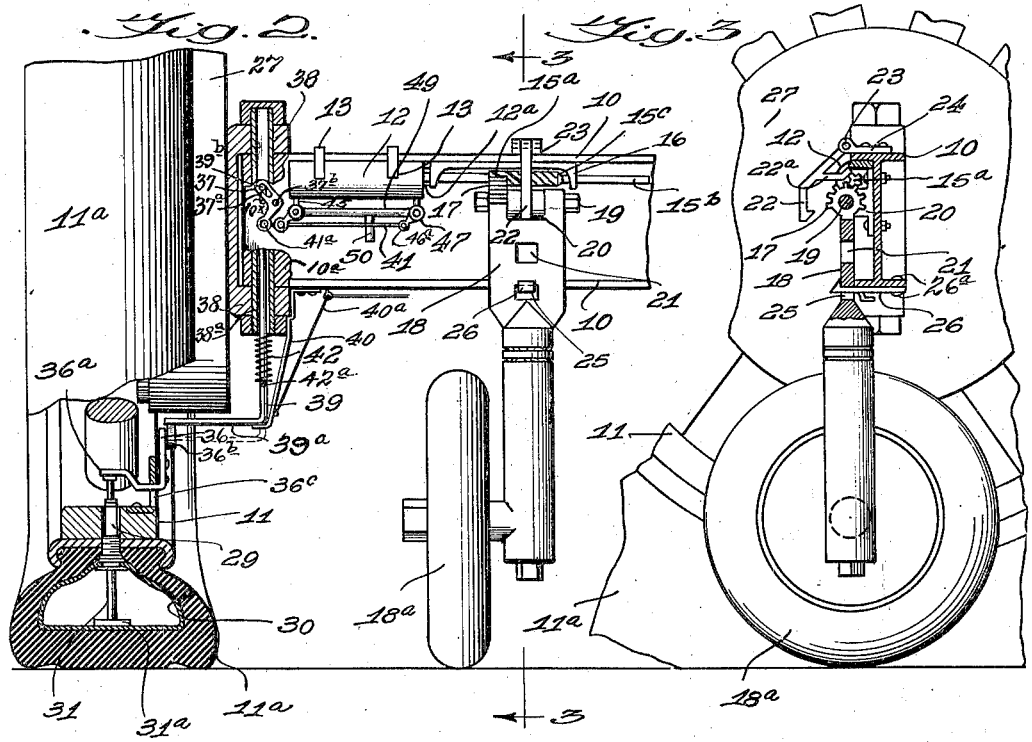
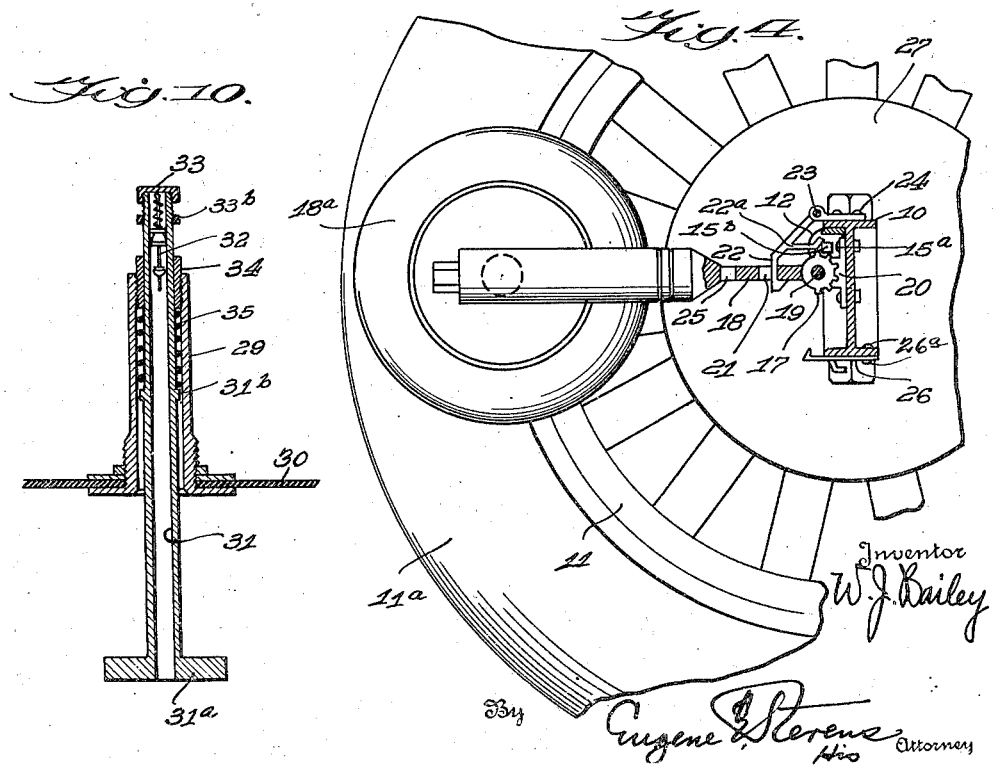

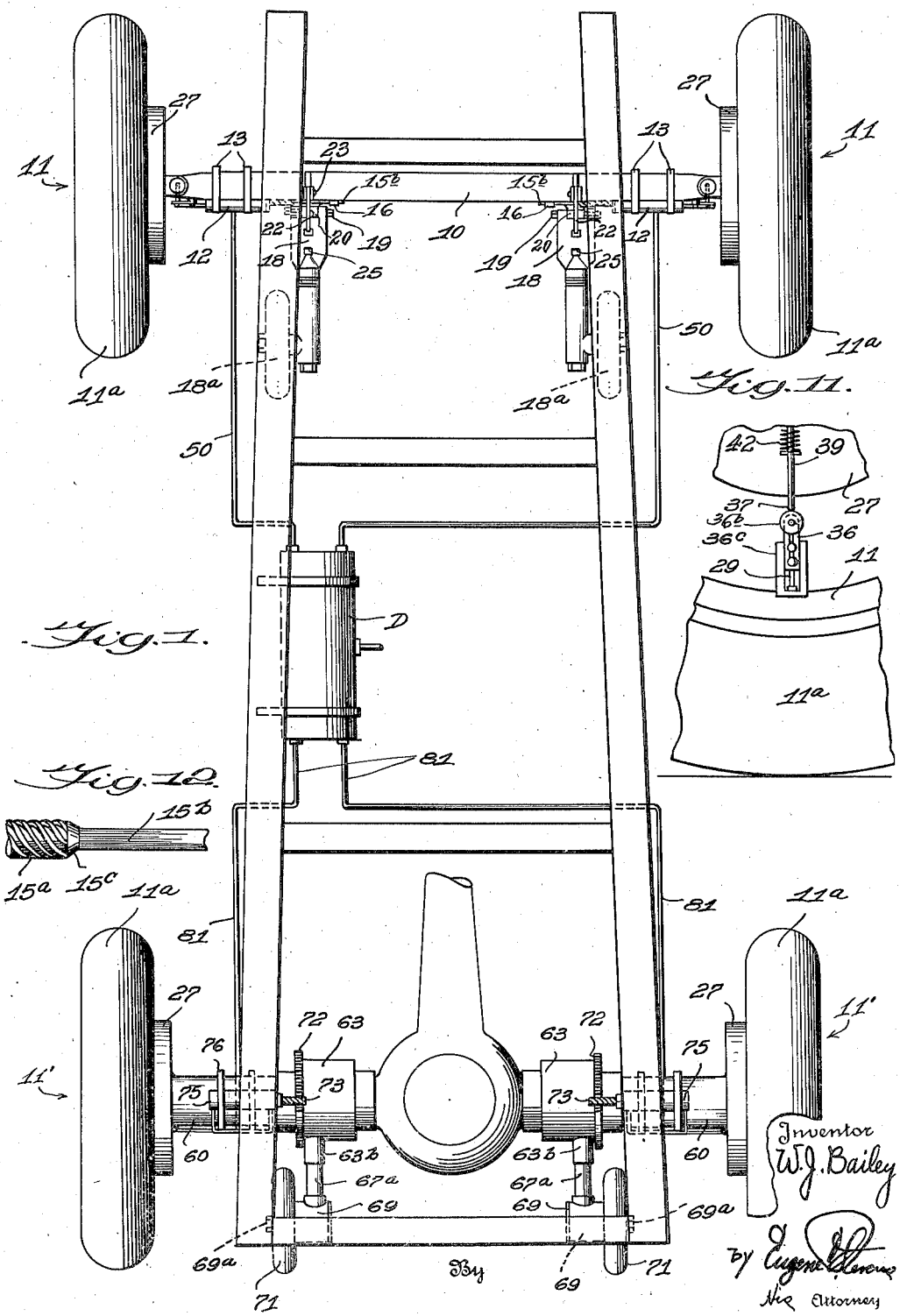

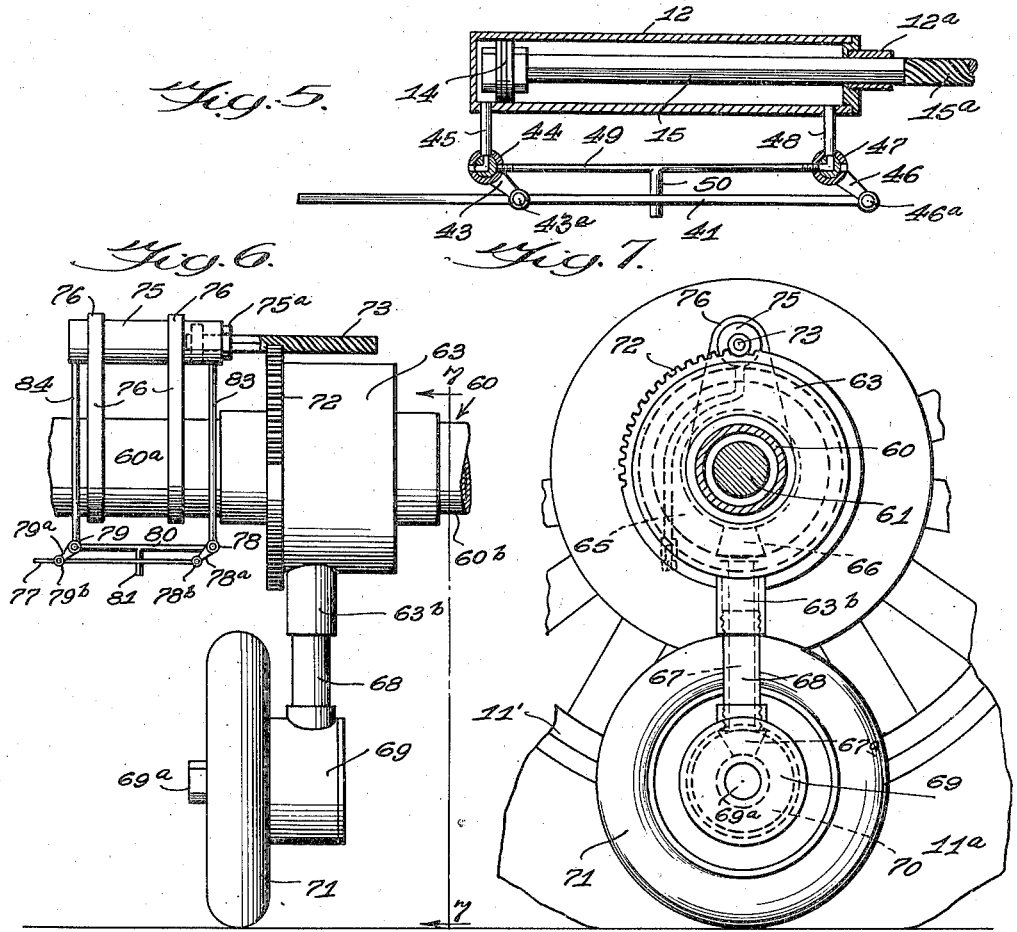
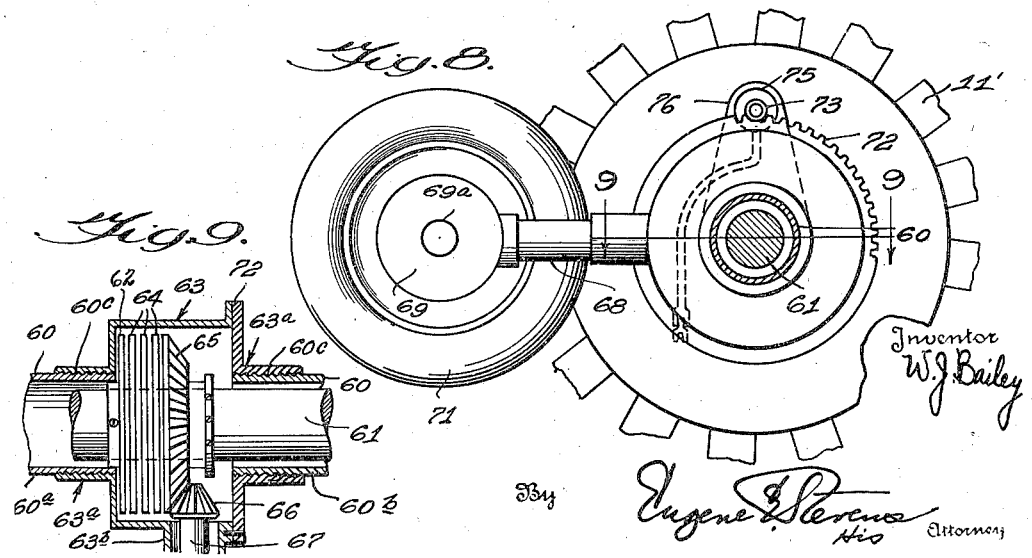

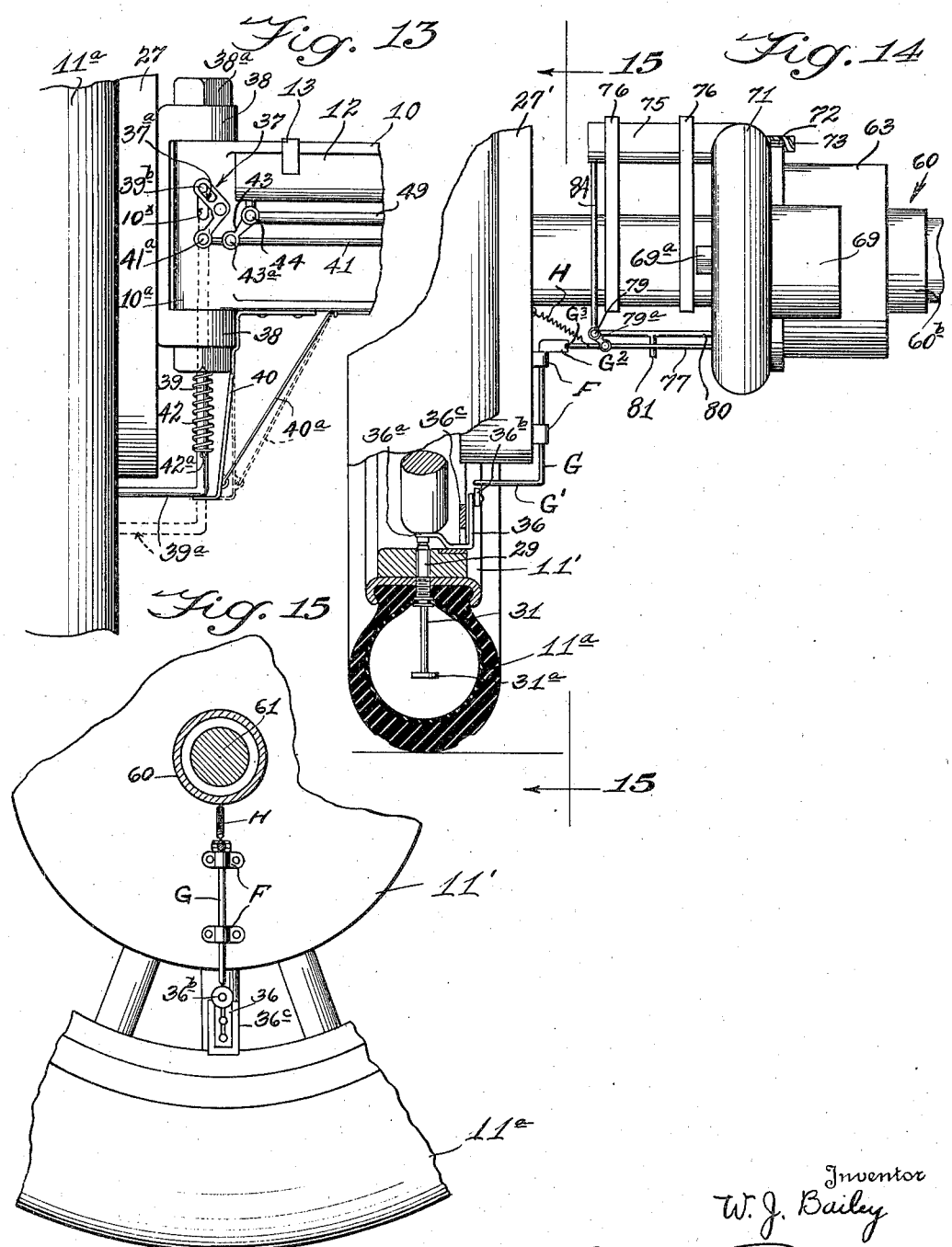

Patented Aug. 9, 1938

2,126,083

UNITED STATES PATENT OFFICE 2,126,083

SAFETY WHEEL FOR AUTOMOBILES

William J. Bailey, Beaumont, Tex.

Application September 28, 1937, Serial No. 166,164

14 Claims. (Cl. 180—15)

My invention relates to improvements in auxiliary or safety wheels for motor vehicles employing pneumatic tires and is applicable to traction as well as non-traction wheels.

Briefly and generally the invention has among its primary objects to provide (1) an auxiliary wheel which will be automatically actuated to ground engaging position when the tire of the adjacent standard wheel becomes substantially deflated, the means for so actuating said auxiliary wheel being preferably operated by a novel valve structure of the conventional inner tube of the standard tire; (2) an auxiliary wheel which can be readily applied to standard automobiles without substantial modification of the usual construction thereof; (3) novel means for holding an auxiliary wheel in its operative and inoperative positions, and (4) novel means for effecting drive of an auxiliary traction wheel when the same is in ground engaging position.

The invention resides in certain novel features of construction, combination and arrangement of various parts, and in modes of operation all of which will be readily understood and appreciated by those skilled in the art upon reference to the accompanying drawings in connection with the detailed construction as follows.

In accordance with the requirements of the patent statutes the now preferred embodiment of the invention is illustrated in the drawings and will be dealt with in the following description, but it is to be understood that the inventive concept is susceptible of other mechanical expressions within the spirit and scope within the subject matter claimed hereinafter.

In the drawings:

Figure 1 is a top plan view of a motor vehicle chassis equipped with my invention;

Figure 2 is a fragmentary front elevational view partly broken and partly in section and showing an auxiliary wheel in operative ground-engaging position;

Figure 3 is a vertical sectional view taken on the line 3—3 of Figure 2 but showing the lower part of standard 18 in elevation;

Figure 4 is a view similar to Figure 3 but showing the auxiliary front wheel in inoperative position;

Figure 5 is a longitudinal sectional view through one of the auxiliary front wheel operating units shown in Figures 1 and 2;

Figure 6 is a fragmentary rear elevational view of the rear axle showing one of the driven auxiliary rear wheels of Figure 1 in its operative position.

Figure 7 is a section taken on line 7—7 of Figure 6;

Figure 8 is a view similar to Figure 7 but showing the auxiliary wheel in inoperative position;

Figure 9 is a vertical longitudinal sectional view of one of the rear auxiliary wheel drive means and taken approximately on the line 9—9 of Figure 8;

Figure 10 is a longitudinal sectional view through one of the special inner tire valve assemblies which is associated with the inner tube of each tire and is adapted to initiate operation of the actuating means of the associated auxiliary wheel;

Figure 11 is a fragmentary elevational view of a portion of a tire rim, felly and brake drum showing parts of the tire valve-operated control means for the auxiliary wheel-operating cylinder of Figures 1 and 2;

Figure 12 is a fragmentary elevational view of the worm and cam-incorporating piston for releasing latch 22, 22a of Figures 2 and 3 and operatively engaging the gear segment 17 of an auxiliary front wheel standard 18;

Figure 13 is an enlarged elevational view of parts shown in Figure 2;

Figure 14 is a view similar to Figure 13 but illustrating application of the invention to a rear wheel;

Figure 15 is a section on line 15—15 of Figure 14.

Referring to the drawings by reference characters, numeral 10 designates the conventional I-section front axle of an automobile having the wheel 11 which is equipped with the usual pneumatic tire 11a.

In carrying out the invention I provide a cylinder 12 which is secured as at 13 to the axle 10 below the top flange thereof as shown in Figures 1 and 2. Working within the cylinder 12 is the piston 14 having the connecting rod 15—see Figure 5—which is square in cross section and has its outer end working through the similarly formed bearing 12a. An intermediate portion of the extended end of connecting rod 15 beyond the bearing 12a is of diametrically enlarged circular cross section and is formed with a worm 15a. Beyond the worm 15a the connecting rod 15, as indicated at 15b is reduced to square cross section approximately corresponding in size to the portion 15. This latter portion 15b of connecting rod 15 works in the guide 16 which is secured to the web portion of the axle 10.

Between the portions 15a and 15b of connecting rod 15 is the inwardly beveled cam portion 15c (see Fig. 12) which is adapted to trip a latch member to be presently referred to.

Coming now to the auxiliary wheel which is adapted to be actuated into ground engaging position when the tire 11a is deflated, I provide the standard 18 whose upper end is journaled as at 19 in a bearing provided by bracket 20 carried by the web portion of axle 10.

The bearing end of the standard 18 is provided with the gear segment 17 which is arranged for operative engagement by the worm portion 15a of connecting rod 15 when the piston 14 is moved from the Figure 5 position toward the right. This operation serves to swing the standard 18 downwardly to the position shown in Figure 2. However, before this can happen the cam portion 15c (see Figs. 2 and 12) engages the lug 22a of the latch 22 to rock the latter outwardly so as to release its bill from the hole 21 in standard 18, thus freeing the standard for operation by worm 15a and gear segment 17. The threads of worm 15a preferably have constant engagement with gear segment 17 but with sufficient play to admit initial tripping of latch 22, 22a. The latch 22 is pivoted as at 23 to a bearing 24 which is mounted upon the top of axle 10.

From the foregoing it will be evident that either latch 22 or the engagement of worm 15a with gear segment 17—or both—normally holds standard 18 in the "up" or operative position to maintain auxiliary wheel 18a out of its vehicle load-supporting position. The worm 15a makes operative engagement with the gear segment 17 at just about the instant that latch 22 is released from standard 18.

When the standard 18 has been actuated downwardly to dispose the auxiliary wheel 18a in its load-supporting ground engaging position, a latch 26 engages in a second hole 25 of standard 18 to hold the auxiliary wheel 18a in such position, although it is to be observed that the worm 15a cooperates with gear segment 17 for this selfsame purpose. Latch 26 is secured as at 26a to the bottom flange of axle 10.

The operating means for the piston 14 will now be described. Fig. 2 shows the usual front wheel 11 has its tire 11a provided with a special valve 29 for the inner tube 30. This valve 29 comprises the sleeve-like stem within which works the sliding tube 31 which will normally have its disklike inner end 31a extended well into the inner tube 30, as shown in Fig. 10. The tube 31 is provided intermediate its ends with the circumferential shoulder 31b. Between the shoulder 31b and a bushing 34 which is screwed into the outer end of the stem 29 is a coil spring 35 which yieldably resists outward movement of the tube 31.

The outer end of the tube 31 is threaded to receive usual cap 33 and a stop nut 33b which serves to limit inward sliding of tube 31 under the action of spring 35. The usual air-retaining valve structure 32 is employed, being screwed into the sliding tube 31. It will furthermore be evident that when the car is in transit the tube 31 will be thrown outwardly toward the periphery of the tire due to spring 35 and to centrifugal action, but when the tire 11a becomes deflated the tube 31 will be pushed inwardly. This effects operation of piston 14, 15 as will now be described.

Referring to Figs. 2 and 11, a slide member 36 is carried by a guide 36c secured to the felly of the wheel 11, or in any other preferred manner and has, at its lower end, the foot 36a which is adapted to be engaged by the upper end of the tube 31 when it is pushed in by the deflated tire casing 11a. The lower end of slide 36 engages the attaching portion of guide 36c to normally dispose arm 36a spaced above the end of tube 31 so long as tire 11a is inflated. The upper end of slide 36 is preferably provided with the roller 36b.

Similarly mounted for sliding movement in the king bolt 38a, which swingably connects to axle bearing 10a and the stub axle bearing 38 is the slide rod 39. This slide rod 39 has at its lower end the lateral outwardly extending arm 39a and at its upper end the short lateral arm 39b which latter extends through slot 10x in bearing 10a and engages in the slot 37a of a bell-crank 37 which is pivoted (37b) to the side of said axle bearing 10a. The other arm of bell crank 37 is pivoted as at 41a to the outer end of a valve-operating connecting rod or lever 41.

Figs. 2 and 11 make it clear that when the tire 11a is deflated and the upper end of the tube 31 engages the arm 36a to slide the member 36 upwardly, the rotation of the wheel 11 causes the roller 36b at the upper end of slide 36 to engage the arm 39a of slide rod 39 to force it upwardly. This rocks bell-crank lever 37 in a clockwise direction (Fig. 2) to actuate the valve operating rod 41 leftwardly as seen in Fig. 2 against the action of spring 42 which encircles slide member 39 between the lower end of king bolt 38 and the rod-carried pin 42a. The downward movement of slide rod 39 under the action of spring 42 is now limited by engagement of the rod portion 39a by an axle-carried spring metal latch 40 so as to prevent slide rod arm 39a from dropping below the upper part of roller 36b when the tire 11a is wholly or partly deflated. Before the tire is deflated the engagement of rod end 39b with the lower end of axle bearing slot 10x (see Figure 13) will maintain the lower rod end 39a out of contact with roller 36b and spring latch 40 will simply bear against the vertical portion of rod 39.

Lever 41 is pivoted adjacent its outer end as at 43a to the operating lever 43 of a valve 44 which, in the position shown in Figure 2, is arranged to establish communication from a compressed air tank D (see Figure 1) to the left hand side of piston 14 (see Fig. 5) by way of the pipes 50, 49, 45. The inner end of rod 41 is pivoted as at 46a to the operating lever 46 of a valve 47. The valve 47 in the position shown in Figure 2 is arranged to establish communication with the atmosphere so as to admit of movement of piston 14 inwardly to dispose the auxiliary wheel standard 18 in the Figures 2 and 3 position from the Figure 4 position. In connection with this it will be remembered that at the start of the movement of piston 14 the cam 15c at the inner end of worm 15a engages arm 22a of latch 22 to free same from recess 21 of standard 18.

However, when tire 11—Figs. 2 and 3—is again inflated and latch 40 (Figs. 2 and 13) has been released by a pull on cord 40a, spring 42 (Fig. 2) acting against bearing 38 and rod pin 39a will again force rod 39 downwardly and through pin and slot connection 39b, 37a will rock bell crank 37 counterclockwise to push rod 41 inwardly from the Figure 2 position to Figure 5 position to reverse the action of valves 44, 47 whereby to return auxiliary wheel 18a to the Figure 4 position. As previously stated, downward movement of the slide rod 39 is limited by rod end 39b engaging the lower end of axle bearing slot 10x.

In other words, valve 44 will be moved to cut off communication of pressure to the cylinder 12 from the compressed air tank D and will establish open communication with the atmosphere, while on the other hand valve 47 will be moved to cut off communication with the atmosphere and to establish communication from the air tank through pipe 50, 59, 58 to the right hand end of chamber 12 as viewed in Fig. 5. This causes the piston 14 to move to the left so as to cause worm 15a which is in mesh with gear segment 17 on wheel standard 18 to actuate the latter from the Figures 2 and 3 position back to the inoperative position shown in Figure 4. Of course latch 26 (Figs. 2 and 3) would be manually freed from standard 18 before inflating tire 11.

Coming now to the matter of the auxiliary traction wheels shown in Figures 1, 5, 6, 7, 8 and 9, numeral 60 designates the tubular rear axle housing which carries the axle 61. Rear axle housing 60 is modified to the extent that it is made in sections 60a, 60b at each end. Adjacent ends of companion sections 60a, 60b are threaded as indicated at 60c and are received by the internally threaded sleeve-like end portions 63a of a housing 63. The rear axle 61 has the bevel gear 65 loosely mounted thereon which is in normal driving engagement with the bevel pinion 66 on the end of an auxiliary wheel drive shaft 67 extending through a tubular standard 68 which is rigidly carried in the boss 63b of the housing 63. The lower end of the tubular standard 68 is connected to the stub-axle housing 69 of the auxiliary traction wheel 71. The outer end of the shaft 67 has the pinion 67a which meshes with bevel gear 70 which is fast on stub-axle 69a of the auxiliary traction wheel 71. Therefore when bevel gear 65 of the axle 61 is driven the traction wheel 70 will also be driven.

Slidably keyed on the axle 61, within housing 63, is one clutch operating disk 62. When tubular standard 68 is swung to bring the wheel 71 to its operative ground-engaging position the housing 63 is also swung. Due to the threaded engagement 60c of housing portions 63a with housing sections 60a, 60b, this swinging results in the end of the housing 63 which is adjacent the disk 62 engaging the latter and forcing it against friction clutch disks 64, which latter are actuated into driving engagement with the adjacent friction face of bevel gear 65. This effects a driving connection between the disk 62 and the bevel gear 65 to the end that the traction wheel 71 will be driven.

Of course, when the tubular standard 63b is swung back up to its inoperative position the driving engagement between 62, 65 will be broken due to the fact that the thread connection 60c between housing 63 and axle housing 60 will permit 62 to recede from gear 65.

It will be noted that the housing 63 has a gear segment 72 engaged by the cylindrical worm end 73 of the cross sectionally square stem or connecting rod 74 of a piston which works in the square bearing 75a of cylinder 75 which latter is rigidly secured to axle housing 60 by metal straps or other fastening means 76.

This worm 73 maintains constant engagement with the gear segment 72 and serves as the means for holding tubular wheel carrying standard 68 in either its operative or inoperative position (see Figs. 7 and 8).

Each of the ordinary rear traction wheels 11' (see Figure 1) will have its tire provided, as shown in Figure 14, with a valve assembly 29, 31 and with the slide member 36 and guide 36c similar to that illustrated in Figures 2 and 10.

Figure 14 shows that the fixed brake drum 27' has the guides F which slidably carry a second slide member G having at its lower end the lateral outwardly extending arm G' which is aligned with the upper end of the wheel-carried slide 36. The upper end of the brake drum-carried slide G has a lateral inwardly extending lug G2 whose end is preferably dished as indicated at G3 to receive the outer end of the valve operating rod 77 which is normally urged against seat G3 by the tension spring H whose ends are connected to drum 27' and to said rod 77. It will be obvious that when the tire 11a of a rear traction wheel 11' goes flat, the tube 31 will be pushed up to engage slide 36 and actuate it upwardly so that its roller 36b will engage arm G' of slide G to actuate same upwardly. This results in the outer end of valve control rod 77 being dislodged from recess G2 whereupon spring H pulls the end of valve control rod 77 into engagement with brake drum 27'. The valve operating rod 77 corresponds to rod 41 of Figure 2 and the control arms 78a, 79a of the valves 78, 79 are pivoted as at 78b, 79b to the rod 77. The valves 78, 79 are located at opposite ends of a pipe 80 having connection 81 with the compressed air tank D. Line 83 connects valve 78 with one end of cylinder 75 and line 84 connects valve 79 with the opposite end of cylinder 75. In the position of the parts shown in Figure 6 the valve 79 is in a position to establish communication between line 80 and the outer end of cylinder 75 so as to actuate the piston and its stem 74, 73 inwardly to bring the auxiliary wheel 71 down to its operative ground-engaging position.

The other valve 78 at this time is in a position to cut off the line 80 from communication with the cylinder 75 through the pipe 83 and to establish communication with the atmosphere. By reversing the position of valves 78, 79 the piston and its rod 74 will be drawn into the cylinder 75 and the standard 68 will be restored to the Figure 8 position. The ratio of gear 65, 66, 67a, 69 will be such that when it is operatively connected to rear axle 61 as it will be when the associated auxiliary wheel 71 is in operative position (Fig. 7) it will propel the vehicle at the same speed as the companion rear wheel 11' at the opposite side.

When control rod 77 is in engagement with recess G3 of the portion G2 of slide member G such portion G2 will be resting upon the uppermost ones of the bearings F so as to hold the roller portion G1 out of engagement with the roller 36B of slide member 36 so long as the tire is inflated.

From the foregoing description the advantages of operation of my apparatus will be apparent. The standard front wheels 11 will serve to guide the vehicle even though one tire 11a thereof is punctured and if desired the bearings of the auxiliary front wheels 18a can have a vertical swiveled connection to standards 18.

Having thus described my invention, what I claim as new is:—

1. The combination with a motor vehicle chassis and at least one of its normal load-supporting wheels and the pneumatic tire thereof; of an auxiliary load-supporting wheel, means for mounting said auxiliary wheel for movement toward and from load-supporting position, and means in part carried by said load-supporting wheel for actuating said auxiliary wheel to operative position when the tire of the former is deflated.

2. The combination with a motor vehicle chassis and at least one of its normal load-supporting wheels and the pneumatic tire thereof; of an auxiliary load-supporting wheel, means for mounting said auxiliary wheel for movement toward and from load-supporting position, and means in part incorporated in the tire of said load-supporting wheel for actuating said auxiliary wheel to operative position when the tire of the former is deflated.

3. The combination with a motor vehicle chassis and at least one of its normal load-supporting wheels and the pneumatic tire thereof; of an auxiliary load-supporting wheel, means for mounting said auxiliary wheel for movement toward and from load-supporting position, and means in part incorporated in the tire valve of said load-supporting wheel for actuating said auxiliary wheel to operative position when the tire of the former is deflated.

4. The combination with a motor vehicle chassis and at least one of its normal load-supporting wheels and the pneumatic tire thereof; of a chassis-carried auxiliary load-supporting wheel, means for mounting said auxiliary wheel adjacent said load-supporting wheel for movement toward and from load-supporting position, power operated means in part carried by the chassis and in part by said auxiliary wheel mounting means and operable to actuate said auxiliary wheel to load-supporting position, and actuating means for said power operated means and carried by said normal load-supporting wheel, said actuating means being movable to set said power operated means in operation when the tire of said normal load-supporting wheel is partially deflated.

5. The combination with a motor vehicle chassis and at least one of its normal load-supporting wheels and the pneumatic tire thereof; of a chassis-carried auxiliary load-supporting wheel, means for mounting said auxiliary wheel adjacent said load-supporting wheel for movement toward and from load-supporting position, power operated means in part carried by the chassis and in part by said auxiliary wheel mounting means and operable to actuate said auxiliary wheel to load-supporting position, movable tire valve means incorporated in the tire of said normal load-supporting wheel and operated when said tire is partially deflated, and actuating means for said power operated means and operated by said movable tire valve means.

6. The combination with a pneumatic tired load-supporting traction wheel, its driven axle, axle housing and the chassis of a motor vehicle; of a movably mounted axle housing-carried auxiliary traction wheel, an air valve for the tire of said first-mentioned wheel and including a deflation responsive movable element, means operable by movement of said deflation-responsive element of the tire valve for moving said auxiliary traction wheel to load-supporting position, driving means for said auxiliary traction wheel, and axle housing carried means operable by the movement of said auxiliary traction wheel to load-supporting position for operatively connecting auxiliary traction wheel to said drive means to said axle.

7. The combination with a pneumatic tired load-supporting traction wheel, its driven axle, axle housing and the chassis of a motor vehicle; of a movably mounted axle housing-carried auxiliary traction wheel, tire deflation-responsive means for moving said auxiliary traction wheel to load-supporting position, driving means for said auxiliary traction wheel, and axle housing-carried means operable by the movement of said auxiliary traction wheel to load-supporting position for operatively connecting the auxiliary traction wheel drive means to said axle.

8. The combination with a pneumatic tired traction wheel, its axle and axle housing; of an auxiliary traction wheel, said axle housing having a gap adjacent said first-mentioned wheel, a mount for said auxiliary traction wheel and threaded to said housing at the site of said gap, a mount and axle carried drive connection between said auxiliary traction wheel and said axle at the site of said gap and which drive connection is disengaged when said auxiliary traction wheel is in inoperative position, means including a tire deflation responsive means associated with said first-mentioned wheel for swinging said auxiliary wheel mount to dispose said auxiliary wheel in its operative position, said threaded connection of said mount with said axle housing effecting axial shifting of said mount during said swinging movement, and said drive connection including an axle-carried element actuated by said mount-shifting movement to establish a driving connection between said axle and auxiliary wheel.

9. The combination with a motor vehicle chassis and at least one of its normal load-supporting wheels and the pneumatic tire thereof; of an auxiliary load-supporting wheel, means for mounting said auxiliary wheel for movement toward and from load-supporting position, latch means carried by said chassis and operable to retain said auxiliary wheel in inoperative position, means for actuating said wheel to operative position, a latch-tripping portion incorporated in said actuating means, and means responsive to deflation of the tire of the first-mentioned wheel for effecting operation of said actuating means.

10. The combination with a motor vehicle chassis and at least one of its normal load-supporting wheels and the pneumatic tire thereof; of an auxiliary load-supporting wheel, means for mounting said auxiliary wheel for movement toward and from load-supporting position, latch means carried by said chassis and operable to retain said auxiliary wheel in inoperative position, means for actuating said wheel to operative position, a latch-tripping portion incorporated in said actuating means, and means responsive to deflation of the tire of the first-mentioned wheel for effecting operation of said actuating means, and a second latch carried by said chassis and operable to retain said auxiliary wheel in operative load-supporting position.

11. The combination with a motor vehicle chassis and its pneumatic tired load-supporting wheels; of an auxiliary wheel carried by said chassis adjacent each of said load-supporting wheels, mounting means for said auxiliary wheels whereby the same can be moved to and from operative position, an actuating unit carried by said chassis adjacent each of said mounting means and operable to actuate the same to dispose the associated auxiliary wheel in operative position, a common motivating source for supplying power to said actuating units, and deflation-responsive means associated with each of said first-mentioned wheels for setting in operation the actuating unit of the associated auxiliary wheel mounting means.

12. The combination with a motor vehicle chassis and its pneumatic tired load-supporting wheels; of an auxiliary wheel carried by said chassis adjacent each of said load-supporting wheels, mounting means for said auxiliary wheels whereby the same can be moved to and from operative position, a valve controlled fluid piston incorporating actuating unit carried by said chassis adjacent each of said mounting means and operable to actuate the same to dispose the associated auxiliary wheel in operative position, a common motivating fluid source for supplying power to said actuating units, and deflation-responsive means associated with each of said first-mentioned wheels for setting in operation the actuating unit of the associated auxiliary wheel mounting means.

13. The combination with a motor vehicle chassis and its pneumatic tired load-supporting wheels and a driven axle for certain of said wheels; of an auxiliary wheel carried by said chassis adjacent each of said load-supporting wheels, mounting means for said auxiliary wheels whereby the same can be moved to and from operative position, an actuating unit carried by said chassis adjacent each of said mounting means and operable to actuate the same to dispose the associated auxiliary wheel in operative position, a common motivating source for supplying power to said actuating units, deflation-responsive means associated with each of said first-mentioned wheels for setting in operation the actuating unit of the associated auxiliary wheel mounting means, and means operable by the movement to operative position of the auxiliary wheels which are adjacent to said second-mentioned load-supporting wheels for operatively connecting said auxiliary wheels to said axle to be driven thereby.

14. The combination with a motor vehicle chassis and its pneumatic tired load-supporting wheels and a driven axle for certain of said wheels; of an auxiliary wheel carried by said chassis adjacent each of said load-supporting wheels, mounting means for said auxiliary wheels whereby the same can be moved to and from operative position, a valve controlled fluid piston-incorporating actuating unit carried by said chassis adjacent each of said mounting means and operable to actuate the same to dispose the associated auxiliary wheel in operative position, a common motivating fluid source for supplying power to said actuating units, deflation-responsive means associated with each of said first-mentioned wheels for setting in operation the actuating unit of the associated auxiliary wheel mounting means, and means operable by the movement to operative position of the auxiliary wheels which are adjacent to said second-mentioned supporting wheels for operatively connecting said auxiliary wheels to said axle to be driven thereby.

WILLIAM J. BAILEY.